United States Patent
Zhang et al.

(10) Patent No.: US 11,482,023 B2
(45) Date of Patent: Oct. 25, 2022

(54) METHOD AND APPARATUS FOR DETECTING TEXT REGIONS IN IMAGE, DEVICE, AND MEDIUM

(71) Applicant: BEIJING BAIDU NETCOM SCIENCE AND TECHNOLOGY CO., LTD., Beijing (CN)

(72) Inventors: Chengquan Zhang, Beijing (CN); Zuming Huang, Beijing (CN); Mengyi En, Beijing (CN); Junyu Han, Beijing (CN); Errui Ding, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 358 days.

(21) Appl. No.: 16/710,528

(22) Filed: Dec. 11, 2019

(65) Prior Publication Data
US 2020/0327384 A1 Oct. 15, 2020

(30) Foreign Application Priority Data
Apr. 11, 2019 (CN) .......................... 201910290330.1

(51) Int. Cl.
*G06V 30/262* (2022.01)
*G06N 20/00* (2019.01)
(Continued)

(52) U.S. Cl.
CPC .......... *G06V 30/268* (2022.01); *G06N 20/00* (2019.01); *G06V 10/22* (2022.01); *G06V 30/153* (2022.01); *G06V 30/10* (2022.01)

(58) Field of Classification Search
None
See application file for complete search history.

(56) References Cited

U.S. PATENT DOCUMENTS

| 5,321,770 A | * | 6/1994 | Huttenlocher | G06V 30/414 |
| | | | | 382/229 |
| 2012/0134588 A1 | * | 5/2012 | Zhang | G06V 10/243 |
| | | | | 382/176 |
| 2017/0140554 A1 | | 5/2017 | Ranjan et al. | |

FOREIGN PATENT DOCUMENTS

| CN | 103679168 A | 3/2014 |
| CN | 106570500 A | 4/2017 |

(Continued)

OTHER PUBLICATIONS

EAST: An Efficient and Accurate Scene Text Detector, Xinyu Zhou et al., «arXiv:1704.03155 v2» , pp. 1-10, Jul. 10, 2017.

(Continued)

*Primary Examiner* — Dov Popovici
(74) *Attorney, Agent, or Firm* — Knobbe Martens Olson & Bear LLP (57) ABSTRACT

A method and apparatus for detecting text regions in an image, a device, and a medium are provided. The method may include: detecting, based on feature representation of an image, a first text region in the image, where the first text region covers a text in the image, a region occupied by the text being of a certain shape; determining, based on a feature block of the first text region, text geometry information associated with the text, where the text geometry information includes a text centerline of the text and distance information of the centerline from the upper and lower borders of the text; and adjusting, based on the text geometry information associated with the text, the first text region to a second text region, where the second text region also covers the text and is smaller than the first text region.

17 Claims, 5 Drawing Sheets

(51) Int. Cl.
*G06V 10/22* (2022.01)
*G06V 30/148* (2022.01)
*G06V 30/10* (2022.01)

(56) References Cited

FOREIGN PATENT DOCUMENTS

| | | |
|---|---|---|
| CN | 107977620 A | 5/2018 |
| CN | 108549893 A | 9/2018 |
| CN | 108734052 A | 11/2018 |
| CN | 108805131 A | 11/2018 |
| CN | 109492638 A | 3/2019 |

OTHER PUBLICATIONS

TextSnake: A Flexible Representation for Detecting Text of Arbitrary Shapes, Shangbang Long et al., «arXiv:1807.01544v1», pp. 1-17, Jul. 2018.

* cited by examiner

METHOD AND APPARATUS FOR DETECTING TEXT REGIONS IN IMAGE, DEVICE, AND MEDIUM

CROSS-REFERENCE TO RELATED APPLICATIONS

This application claims priority to Chinese Patent Application No. 201910290330.1, filed with the China National Intellectual Property Administration (CNIPA) on Apr. 11, 2019, the contents of which are incorporated herein by reference in their entirety.

TECHNICAL FIELD

Embodiments of the present disclosure generally relate to the field of image processing, and more specifically to a method and apparatus for detecting text regions in an image, an electronic device, and a computer-readable storage medium.

BACKGROUND

Image object detection refers to locating and detecting objects of interest in an image and giving a region (e.g., a bounding box) of each object. The image object detection has been widely applied in the fields of face recognition, intelligent monitoring, image retrieval, text recognition, robot navigation, etc. Image text detection is to detect a text region including various characters from an image, and then to recognize or process the characters in the text region. Therefore, the image text detection is the basis and premise of image text recognition and further processing. With the wide application of convolutional neural networks (CNN) in image processing, the image text detection can detect certain text objects more accurately.

Generally, methods of image text detection may be divided into three kinds: a component-based method, a detection-based method, and a segmentation-based method. The component-based method first detects basic components of a text and then combines the components of the same text line together. The detection-based method is to detect a bounding box of a text from an image, for example, a polygonal text box. The segmentation-based method relies on the centerline or border of a text to segment regions of text instances, and can achieve pixel-level segmentation.

SUMMARY

Embodiments of the present disclosure provide a method and apparatus for detecting a text region in an image, a device and a computer-readable medium.

In a first aspect of the present disclosure, a method for detecting a text region in an image is provided. The method includes: detecting, based on feature representation of an image, one or more text regions in the image, a first text region of the one or more text regions being represented by a polygon and covering a text in the image, a region occupied by the text being of a certain shape; determining, based on a feature block of the first text region, text geometry information associated with the text, the text geometry information including at least a text centerline of the text and distance information of the centerline from the upper and lower borders of the text; and adjusting, based on the text geometry information associated with the text, the first text region to a second text region, the second text region also covering the text and being smaller than the first text region.

In a second aspect of the present disclosure, an apparatus for detecting a text region in an image is provided. The apparatus includes: a text region detecting module, configured to detect, based on feature representation of an image, one or more text regions in the image, a first text region of the one or more text regions being represented by a polygon and covering a text in the image, a region occupied by the text being of a certain shape; a geometry information determining module, configured to determine, based on a feature block of the first text region, text geometry information associated with the text, the text geometry information including at least a text centerline of the text and distance information of the centerline from the upper and lower borders of the text; and a text region adjusting module, configured to adjust, based on the text geometry information associated with the text, the first text region to a second text region, the second text region also covering the text and being smaller than the first text region.

In a third aspect of the present disclosure, a device is provided, the device includes: one or more processors; and a storage apparatus which stores one or more programs, where the one or more programs, when executed by the one or more processors, cause the electronic device to implement the methods or processes according to some embodiments of present disclosure.

In a fourth aspect of the present disclosure, a computer-readable storage medium is provided. The computer-readable storage medium stores computer program thereon, where when the program is executed by a processor, the methods or processes according to some embodiments of present disclosure are performed.

It should be understood that the content described in the summary part is not intended to limit the key features or important features of the embodiments of the present disclosure, nor is it intended to limit the scope of the present disclosure. Other features of the present disclosure will become easily understood by the following description.

BRIEF DESCRIPTION OF THE DRAWINGS

The above and other features, advantages and aspects of various embodiments of the present disclosure will become more apparent with reference to the accompanying drawings and detailed descriptions below. The same or similar reference signs in the drawings denote the same or similar elements, in which.

DETAILED DESCRIPTION OF EMBODIMENTS

Embodiments of the present disclosure will be described in more detail below with reference to the accompanying drawings. Although some embodiments of the present disclosure are shown in the drawings, it should be appreciated that the present disclosure may be implemented in various forms and should not be construed as limited to the embodiments described here, and these embodiments are provided in turn for more thorough and complete understanding of the present disclosure. It should be understood that the drawings and embodiments of the present disclosure are merely illustrative, but are not intended to limit the scope of the present disclosure.

In the description of the embodiments of the present disclosure, the term "include" and the like should be interpreted as open inclusion, i.e., "include but not limited to". The term "based on" should be interpreted as "at least partially based on". The term "one embodiment" or "the embodiment" should be interpreted as "at least one embodiment". The term "some embodiments" should be interpreted as "at least some embodiments". Other explicit and implicit definitions may also be included below.

Conventional text detection method can detect an input image and output one or more text regions in the image, where each text region can be represented by a quadrilateral text box. However, the text box detected by the conventional text detection method is usually a rectangular box, a rectangular box with an oblique angle, or an arbitrary quadrilateral box. The conventional method may well cover rectangular texts. However, for some non-rectangular (e.g., arc-shaped, circular-shaped, curved-shaped, wavy-shaped, etc.) texts, if ordinary quadrilateral boxes are still output, the text bounding boxes are not compact enough, which may cause the subsequent inaccurate text recognition and the like. Therefore, for a text of an arbitrary shape in an image, the conventional universal text detection method cannot obtain a compact text bounding box.

Embodiments of the present disclosure propose a solution for detecting text regions in an image, which can output a more compact and text-fitting bounding box by reconstructing the text region. By adding an arbitrary shape text detecting module on the basis of a universal text detecting module, a more compact text detecting result can be output, thereby improving the accuracy of image text detection. It should be understood that the arbitrary shape text detecting module according to some embodiments of the present disclosure may be inserted as a module into a conventional quadrilateral detector. The improved accuracy of text detection is more conducive to services such as optical character recognition (OCR), and promotes the further application of OCR technology in service scenes such as natural scenes, menus, and bills. Some example embodiments of the present disclosure will be described in detail below with reference to FIGS. 1-8.

Figure 1:
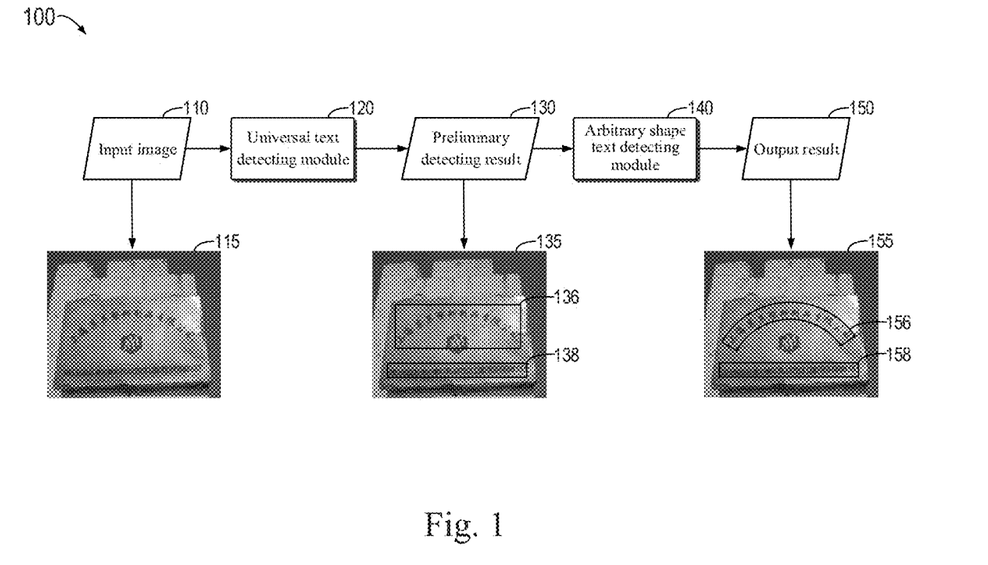
FIG. 1 shows a schematic diagram of an environment for detecting text regions in an image according to an embodiment of the present disclosure.

FIG. 1 shows a schematic diagram of an example environment 100 for detecting text regions in an image according to an embodiment of the present disclosure. As shown in FIG. 1, in the example environment 100, the input image 110 may be a natural scene image 115 including a text of an arbitrary shape. In the example of FIG. 1, the image 115 is a photo of a company nameplate, including an arc-shaped Chinese text "上海某某塑料制品有限公司" and a square English text "SHANGHAI MOUMOU PLASTICS LIMITED COMPANY".

A universal text detecting module 120 is capable of obtaining a preliminary detecting result 130, such as an image 135, for the input image 110. As shown in FIG. 1, the image 135 includes a text box 136 for the Chinese text and a text box 138 for the English text. In the example of FIG. 1, the text boxes 136 and 138 both can completely cover the Chinese text and the English text. However, if the text boxes 136 and 138 cannot cover the complete Chinese text and English text, the text boxes can be corrected to completely cover the texts, for example, the coordinates of corners of the text boxes can be adjusted by a corner attention mechanism. In an embodiment of the present disclosure, the term "text" may refer to characters in any language or form, such as Chinese characters, English or other language characters, numbers, or combinations thereof.

The universal text detecting module 120 may obtain, based on a feature image of the input image 110, the text boxes 136 and 138 as the preliminary detecting result. In some embodiments, the universal text detecting module 120 may adopt a ResNet50+FPN neural network of, where ResNet50 is a deep residual network, and the neural network can be trained more easily by residual learning. In some embodiments, eight channels may be used to predict the coordinates of four corners of a quadrilateral text box, thereby obtaining the quadrilateral text box. In some embodiments, a quadrilateral text box may be obtained by deep regression method. By the end-to-end design, the deep regression method can maximize word-level annotation and achieve good detection performance. However, the text region detected by the conventional method may not be compact enough, as shown by the text box 136 of FIG. 1.

Further referring to FIG. 1, since the Chinese text "上海某 某塑料制品有限公司" in the image 115 is arc-shaped, the text box 136 detected by the universal text detecting module 120 can cover the arc-shaped text, but the text box itself is not compact enough. In some embodiments of the present disclosure, the text of an arbitrary shape may refer to other regular or irregular text that is not rectangular.

According to an embodiment of the present disclosure, an arbitrary shape text detecting module 140 is capable of adjusting the preliminary detecting result 130 and generating an adjusted output result 150, such as an image 155. As shown in FIG. 1, the text box 156 and the text box 158 in the image 155 can also cover the complete Chinese text and English text, respectively. At the same time, the text box 156 is more compact than the text box 136, which improves the accuracy of image text detection. By adding an arbitrary shape text detecting module 140 on the basis of the universal text detecting module 120, a compact text region in the image can be detected more accurately.

It should be understood that the universal text detecting module 120 may be any universal text detecting module known or developed in the future, and is capable of outputting a polygonal text box with an identified text region for an input image. In addition, although text boxes are used as example representation form for identifying text regions in the embodiments of the present disclosure, any other appropriate method (e.g., corner coordinate sets, etc.) for identifying text regions may also be used in combination with the embodiments of the present disclosure.

Figure 2:
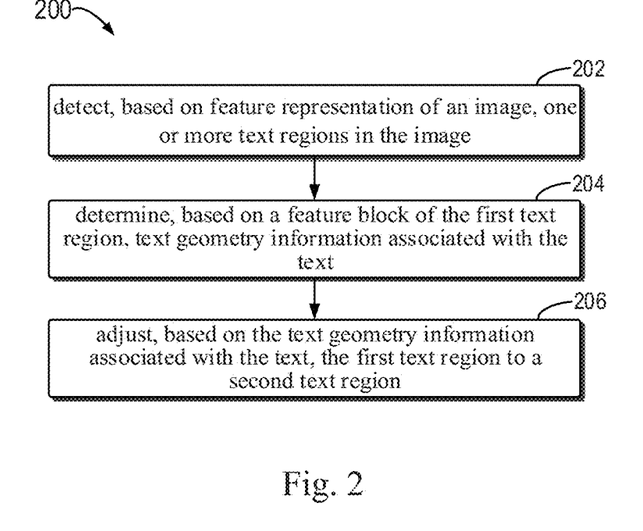
FIG. 2 shows a flowchart of a method for detecting text regions in an image according to an embodiment of the present disclosure.

FIG. 2 shows a flowchart of a method 200 for detecting text regions in an image according to an embodiment of the present disclosure. It should be understood that the method 200 can be performed by the universal text detecting module 120 and the arbitrary shape text detecting module 140 described with reference to FIG. 1.

In block 202, one or more text regions in an image are detected based on feature representation of the image, where a first text region of the one or more text regions is represented by a polygon and covers a text in the image, a region occupied by the text being of a certain shape. In an embodiment of the present disclosure, the text may be in an arbitrary shape. For example, the universal text detecting module 120 described with reference to FIG. 1 obtains a plurality of text regions, such as text boxes 136 and 138, as a preliminary detecting result based on the feature image of the input image 110. For example, the detected text region may be represented by a plurality of corners of the polygon. In some embodiments, the detected text region may be represented by a rectangular text box. In still some embodiments, the detected text region may be represented by an arbitrary quadrilateral text box. In addition, the text box 136 in FIG. 1 can cover the arc-shaped Chinese text, but is not compact enough.

In block 204, text geometry information associated with the text is determined based on a feature block of the first text region, where the text geometry information includes at least a text centerline of the text and distance information of the centerline from the upper and lower borders of the text. In some embodiments, the text geometry information may also include a character region of the text, which may be used for further verification. For example, the arbitrary shape text detecting module 140 described with reference to FIG. 1 may extract the feature block of the text box 136, and then determine the text centerline of the arc-shaped Chinese text "上海某某塑料制品有限公司" in the text box 136 and the distance information of the centerline from the upper and lower borders. An example implementation of the text geometry information is described below with reference to FIG. 4.

In block 206, the first text region is adjusted to a second text region based on the text geometry information associated with the text, the second text region also covering the text and being smaller than the first text region. For example, the arbitrary shape text detecting module 140 described with reference to FIG. 1 can adjust the initial text box 136 to a complete text box 156 based on the text geometry information. Compared with the text box 136, the text box 156 can cover the text more compactly, thereby improving the accuracy of image text detection.

Figure 3:
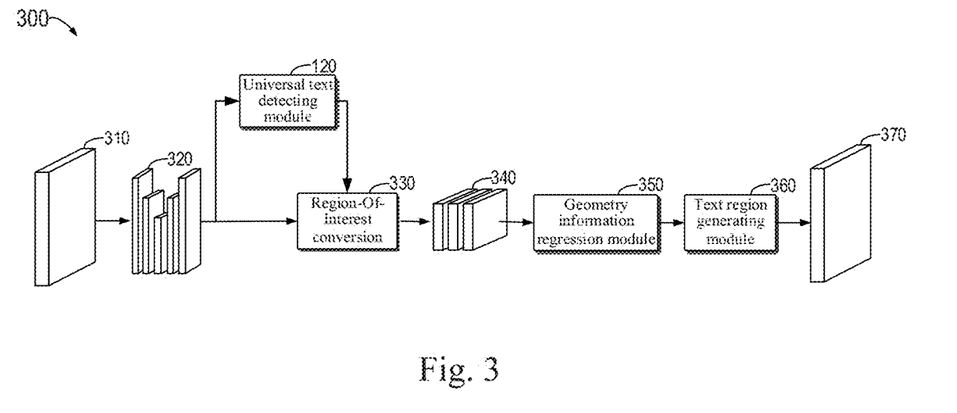
FIG. 3 shows a schematic diagram of an example process of detecting a text of an arbitrary shape in an image according to an embodiment of the present disclosure.

FIG. 3 shows a schematic diagram of an example process 300 of detecting a text of an arbitrary shape in an image according to an embodiment of the present disclosure. As shown in FIG. 3, an input image 310 may be pre-processed first, and then feature images 320 of the image 310 may be obtained, where the feature images 320 may include hidden layer features of the image 310 in a machine learning model. The universal text detecting module 120 may obtain a preliminary detecting result, such as a quadrilateral text box, based on the feature images 320 of the image 310. For a non-rectangular text, the preliminary detecting result may not be compact. By adding an arbitrary shape text detecting module on the basis of the universal text detecting module, a more compact text detecting result can be obtained, thereby improving the accuracy of image text detection.

Referring to FIG. 3, in block 330, a region-of-interest (ROI) conversion is performed based on the quadrilateral text box detected by the universal text detecting module 120 and the feature images 320, to extract a feature block corresponding to the detected quadrilateral text box from the feature image 320. The ROI conversion can convert the feature images 320 to fixed sizes and feed to a neural network. In some embodiments, an arbitrary quadrilateral text box can be converted into a rectangular region that is, for example, 64 pixels wide and 8 pixels high, thereby obtaining a feature block of 8×64×128, where 128 represents the number of channels of the feature block, i.e., dimensions. Then, the feature block may be enhanced by three convolution layers having a convolution kernel size of 3×3, to further extract richer semantic features 340.

Next, a geometry information regression module 350 according to the embodiment of the present disclosure may obtain, according to the features 340, text geometry information of the quadrilateral text box detected by the universal text detecting module 120, where the geometry information regression module 350 may implement geometry information regression of a text instance.

Figure 4:
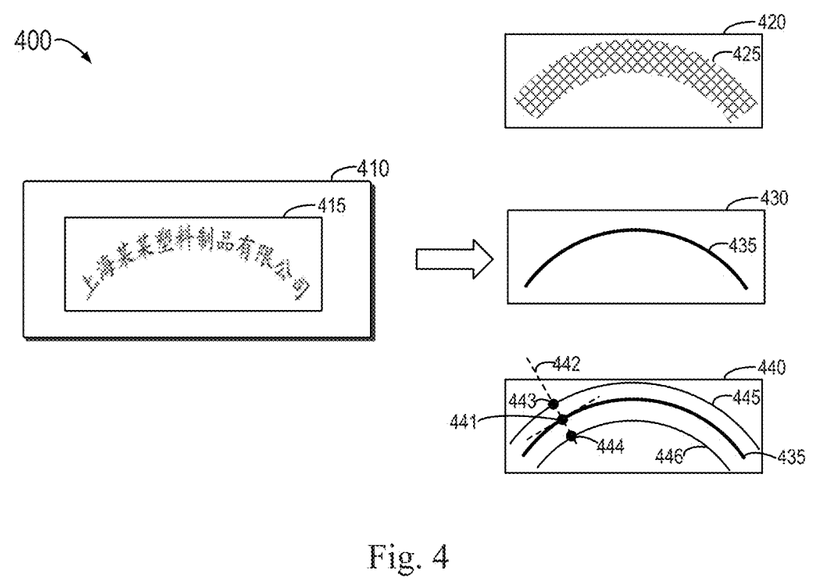
FIG. 4 shows a schematic diagram of example text geometry information according to an embodiment of the present disclosure.

FIG. 4 shows a schematic diagram 400 of example text geometry information according to an embodiment of the present disclosure. As shown in FIG. 4, the universal text detecting module 120 first detects a quadrilateral text box 415 from an image 410. The text box 415 can cover the text, but is not compact enough, and therefore requires further compression and refinement. The geometry information regression module 350 according to the embodiment of the present disclosure may obtain, based on the feature block of the text box 415, text geometry information of the text instance.

In some embodiments, the text geometry information may include: a text region response image 420, indicating a character region 425 of the text, for example, pixels that fall within a compact standard text box may be labeled 1 and pixels at other locations may be labeled 0; a text centerline response image 430, indicating a text centerline 435, for example, a region neighbouring the text centerline may be labeled 1 and regions at other locations may be labeled 0; and a distance information image 440, including distance deviation values of intersections from the centerline 435 to upper and lower border lines. The embodiment of the present disclosure does not require a continuous response to the text centerline, and even if the several does not respond, the complete detection is not affected, so the embodiment of the present disclosure has better robustness for stuck and broken scenes.

As shown in FIG. 4, in order to obtain the distance information image 440, a centerline point 441 on the text centerline 435 may be taken, then a normal 442 perpendicular to the tangent of the current location is drawn, the normal 442 intersects the upper and lower border lines 445 and 446 to obtain an upper border point 443 and a lower border point 444, and the coordinate differences between the centerline point 441 and the upper and lower border points 443 and 444 are required regression deviation values. Furthermore, since the upper and lower border information is regressed as described in the present disclosure, the reading direction information of the text can be determined, which facilitates subsequent text recognition.

Figure 5:
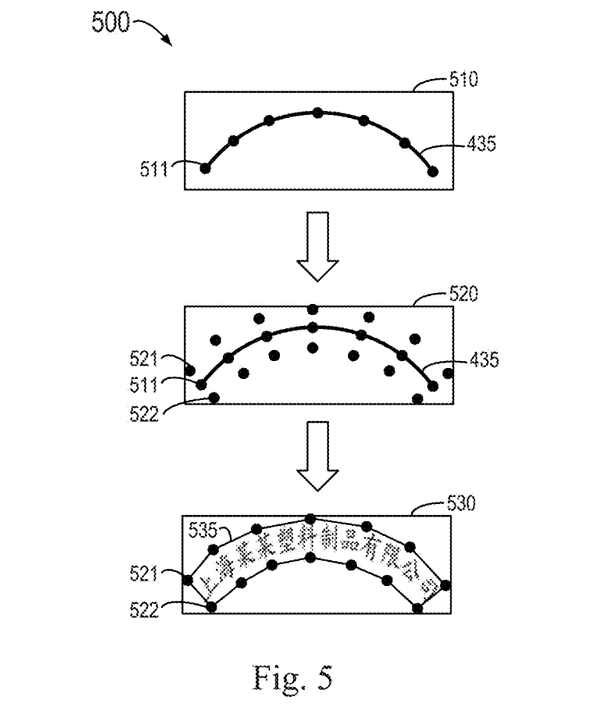
FIG. 5 shows a schematic diagram of a process of generating a compact text region according to an embodiment of the present disclosure.

Referring back to FIG. 3, after the text geometry information is obtained, a text region generating module 360 may generate a new compact text region based on the text geometry information, to obtain an adjusted text box as an output result 370. The text region generating module 360 may implement the expression of the polygonal text and the reconstruction of the text box, to generate a compact text box. FIG. 5 shows a schematic diagram of a process 500 of generating a compact text region according to an embodiment of the present disclosure. In block 510, a plurality of centerline points, such as center points 511, are sampled from the text centerline 435 at equal intervals. For example, a threshold (e.g., 0.5) is provided on the centerline response image 430, the pixels satisfying the threshold are valid centerline points, and then a plurality of points (e.g., 7) are sampled at equal intervals from left to right. In some embodiments, the number of centerline points to be sampled may be determined based on geometry information (e.g., the ratio of long side to short side) of the text region 425. In this way, a suitable number of sampling points can be obtained to reduce distortion during subsequent stretching.

With continued reference to FIG. 5, in block 520, a plurality of upper border points and a plurality of lower border points corresponding to the plurality of centerline points are generated based on the distance information in the distance information image 440. For example, for the centerline point 511, corresponding upper border point 521 and lower border point 522 are generated. In block 530, the plurality of upper border points and the plurality of lower border points are connected to obtain a polygonal text box 535. For example, all the upper border points are connected from left to right starting from leftmost upper border point, then the rightmost lower border point is connected, then all the lower border points are connected from right to left, and finally to the leftmost upper border point to form the polygonal text box 535.

In some embodiments, the confidence of the polygonal text box 535 may be verified using the character region 425. If the confidence satisfies a predetermined condition, the polygonal text box 535 is determined as the adjusted text region; conversely, if the confidence does not satisfy the predetermined condition, the text region may not be adjusted. For example, the score of response to the character region within the polygonal text box may be counted for validity verification. Different from reconstructing a text box only based on the character region, the polygonal text box is obtained from the upper and lower border points of the centerline points in the embodiment of the present disclosure, where more symmetric upper and lower border point can be obtained, thereby reducing the distortion of characters during subsequent stretching of the text box.

In some embodiments, after the polygonal text box 535 is obtained, the polygonal text box 535 may be stretched segment by segment to obtain a rectangular text region, for subsequent text recognition. For example, the polygonal text box may be divided into a plurality of quadrilateral text boxes, each quadrilateral text box including two adjacent upper border points and two corresponding lower border points. Then, each of the plurality of quadrilateral text boxes is stretched to transform the polygonal text box 535 into a rectangular text box (not shown). In this way, the text of an arbitrary shape can be transformed into a rectangular text box, thereby improving the accuracy of subsequent recognition.

Figure 6:
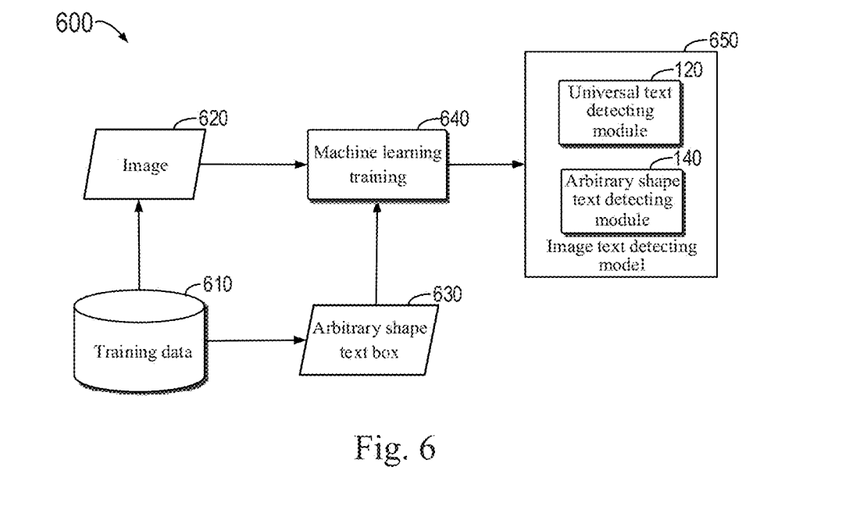
FIG. 6 shows a schematic diagram of training an image text detecting model according to an embodiment of the present disclosure.

FIG. 6 shows a schematic diagram 600 of training an image text detecting model according to an embodiment of the present disclosure. According to the embodiment of the present disclosure, the image text detecting model may be trained based on an annotated data set by an end-to-end way. As shown in FIG. 600, the training data 610 includes an image 620 and an annotated arbitrary shape text box 630 that can compactly cover a text of an arbitrary shape. Then, in block 640, the image 620 and the corresponding annotated arbitrary shape text box 630 may be used for machine learning training, to train to obtain an image text detecting model 650. According to the embodiment of the present disclosure, the universal text detecting module 120 and the arbitrary shape text detecting module 140 can be simultaneously trained using the training data by an end-to-end way, thereby improving the training efficiency.

In the training phase of the image text detecting model 650, for example, the object function $L_{sem}$ of the image text detecting model 650 may be defined by the following equation (1).

$$L_{sem} = \frac{1}{K}\sum^{K}(\lambda_1 L_{tr} + \lambda_2 L_{tcl} + \lambda_3 L_{border}) \quad (1)$$

Where K represents the number of initial detecting results obtained from the universal text detecting module, $L_{tr}$ represents a Dice coefficient loss of the text character region, $L_{tcl}$ represents a Dice coefficient loss of the text centerline, $L_{border}$ is calculated by a smooth $L_1$ loss function, and $\lambda_1$, $\lambda_2$ and $\lambda_3$ are empirical values.

Figure 7:
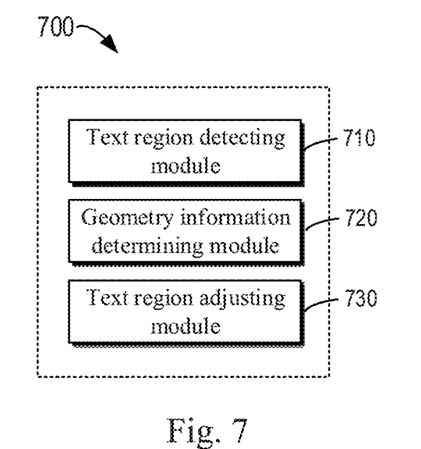
FIG. 7 shows a block diagram of an apparatus for detecting text regions in an image according to an embodiment of the present disclosure.

FIG. 7 shows a block diagram of an apparatus 700 for detecting text regions in an image according to an embodiment of the present disclosure. As shown in FIG. 7, the apparatus 700 includes a text region detecting module 710, a geometry information determining module 720, and a text region adjusting module 730. The text region detecting module 710 is configured to detect, based on feature representation of an image, one or more text regions in the image, where a first text region of the one or more text regions is represented by a polygon and covers a text in the image, and a region occupied by the text being of a certain shape. The geometry information determining module 720 is configured to determine, based on a feature block of the first text region, text geometry information associated with the text, where the text geometry information includes at least a text centerline of the text and distance information of the centerline from the upper and lower borders of the text. The text region adjusting module 730 is configured to adjust, based on the text geometry information associated with the text, the first text region to a second text region, where the second text region also covers the text and is smaller than the first text region.

In some embodiments, the geometry information determining module 720 includes: a region-of-interest conversion module, configured to extract the feature block of the first text region from the feature representation of the image through region-of-interest conversion; and a feature enhancing module, configured to enhance the feature block using a plurality of convolution layers in a convolutional neural network.

In some embodiments, the region-of-interest conversion module includes a feature obtaining module, configured to obtain the feature block of a predetermined size of the first text region by converting the first text region into a predetermined number of rectangular regions.

In some embodiments, the text region adjusting module 730 includes: a centerline point sampling module, configured to sample a plurality of centerline points from the text centerline at equal intervals; a border point generating module, configured to generate, based on the distance information, a plurality of upper border points and a plurality of lower border points corresponding to the plurality of centerline points; and a polygonal text box obtaining module, configured to obtain a polygonal text box by connecting the plurality of upper border points and the plurality of lower border points box.

In some embodiments, the text geometry information further includes a character region of the text, and the text region adjusting module 730 further includes: a confidence verification module, configured to verify the confidence of the polygonal text box by using the character region; and a second text region determining module, configured to determine, in response to the confidence satisfying a predetermined condition, the polygonal text box as the second text region.

In some embodiments, the apparatus 700 further includes: a dividing module, configured to divide the polygonal text box into a plurality of quadrilateral text boxes based on the plurality of upper border points and the plurality of lower border points; and a transformation module, configured to transform the polygonal text box into a rectangular text box by stretching each of the plurality of quadrilateral text boxes.

In some embodiments, the first text region is represented by a quadrilateral text box, and the centerline point sampling module includes a sampling number determining module configured to determine, based on geometry information of the character region, the number of to-be-sampled centerline points.

In some embodiments, the apparatus 700 further includes a training module, configured to train the text region detecting module and the geometry information determining module by using training data by an end-to-end way, where the training data includes images and annotated arbitrary shape text boxes.

It should be understood that the text region detecting module 710, the geometry information determining module 720, and the text region adjusting module 730 shown in FIG. 7 may be included in one or more electronic devices. Moreover, it should be understood that the modules illustrated in FIG. 7 may perform the steps or operations in the methods or processes according to some embodiments of the present disclosure. By adding an arbitrary shape text detecting module having a geometry information determining function and a text region adjusting function on the basis of the universal text detecting module, a more compact text detecting result can be obtained, thereby improving the accuracy of image text detection.

Figure 8:
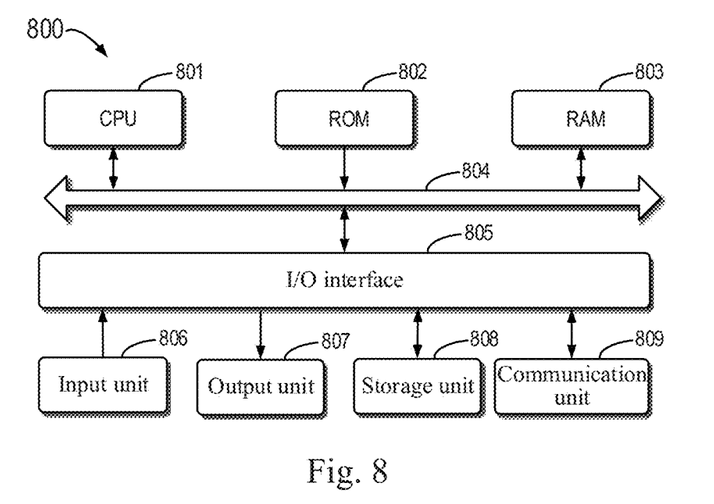
FIG. 8 shows a block diagram of an electronic device capable of implementing some embodiments of the present disclosure.

FIG. 8 shows a schematic block diagram of an example device 800 that can be used to implement some embodiments of the present disclosure. It should be understood that the device 800 may be used to implement the apparatus 700 for detecting text regions in an image of the present disclosure. As shown in the figure, the device 800 includes a central processing unit (CPU) 801 that may perform various appropriate operations and processing in accordance with computer program instructions stored in a read-only memory (ROM) 802 or computer program instructions loaded into a random access memory (RAM) 803 from a storage unit 808. In the RAM 803, various programs and data required by operation of the device 800 may also be stored. The CPU 801, the ROM 802, and the RAM 803 are connected to each other via a bus 804. An input/output (I/O) interface 805 is also connected to the bus 804.

A plurality of components in the device 800 are connected to the I/O interface 805, including: an input unit 806, such as a keyboard or a mouse; an output unit 807, such as various types of displays or speakers; a storage unit 808, such as a magnetic disk or an optical disk; and a communication unit 809, such as a network card, a modem, or a wireless communication transceiver. The communication unit 809 allows the device 800 to exchange information/data with other devices over a computer network such as the Internet and/or various telecommunication networks.

The processing unit 801 performs the various methods and processes described above, such as the method 200. For example, in some embodiments, the method may be implemented as a computer software program that is tangibly embodied in a machine-readable medium, such as the storage unit 808. In some embodiments, some or all of the computer program may be loaded and/or installed to the device 800 via the ROM 802 and/or the communication unit 809. When a computer program is loaded into the RAM 803 and executed by the CPU 801, one or more of the actions or steps of the method described above may be performed. Alternatively, in other embodiments, the CPU 801 may be configured to perform the method by any other suitable means (e.g., by means of firmware).

The functions described herein above may be performed, at least in part, by one or more hardware logic components. For example, and without limitation, types of hardware logic components that may be used include: Field Programmable Gate Array (FPGA), Application Specific Integrated Circuit (ASIC), Application Specific Standard Product (ASSP), System on Chip (SOC), Complex Programmable Logic Device (CPLD), and the like.

Program codes for implementing the method of the present disclosure may be written in any combination of one or more programming languages. These program codes may be provided to a processor or controller of a general purpose computer, special purpose computer or other programmable data processing apparatus such that the program codes, when executed by the processor or controller, enables the functions/operations specified in the flowcharts and/or block diagrams being implemented. The program codes may execute entirely on the machine, partly on the machine, as a stand-alone software package partly on the machine and partly on the remote machine, or entirely on the remote machine or server.

In the context of the present disclosure, the machine readable medium may be a tangible medium that may contain or store programs for use by or in connection with an instruction execution system, apparatus, or device. The machine readable medium may be a machine readable signal medium or a machine readable storage medium. The machine readable medium may include, but is not limited to, an electronic, magnetic, optical, electromagnetic, infrared, or semiconductor system, apparatus, or device, or any suitable combination of the foregoing. More specific examples of the machine readable storage medium may include an electrical connection based on one or more wires, portable computer disk, hard disk, random access memory (RAM), read only memory (ROM), erasable programmable read only memory (EPROM or flash memory), optical fiber, portable compact disk read only memory (CD-ROM), optical storage device, magnetic storage device, or any suitable combination of the foregoing.

In addition, although various actions or steps are described in a specific order, this should not be understood that such actions or steps are required to be performed in the specific order shown or in sequential order, or all illustrated actions or steps should be performed to achieve the desired result. Multitasking and parallel processing may be advantageous in certain circumstances. Likewise, although several specific implementation details are included in the above discussion, these should not be construed as limiting the scope of the present disclosure. Certain features described in the context of separate embodiments may also be implemented in combination in a single implementation. Conversely, various features described in the context of a single implementation may also be implemented in a plurality of implementations, either individually or in any suitable subcombination.

Although the embodiments of the present disclosure are described in language specific to structural features and/or method logic actions, it should be understood that the subject matter defined in the appended claims is not limited to the specific features or actions described above. Instead, the specific features and actions described above are merely examples of implementing the claims.

What is claimed is:

1. A method for detecting a text region in an image, comprising:
   detecting, based on feature representation of an image, one or more text regions in the image, a first text region of the one or more text regions being represented by a polygon and covering a text in the image, a region occupied by the text being of a certain shape;
   determining, based on a feature block of the first text region, text geometry information associated with the text, the text geometry information comprising at least a text centerline of the text and distance information of the centerline from an upper border of the text and a lower border of the text; and
   adjusting, based on the text geometry information associated with the text, the first text region to a second text region, the second text region also covering the text and being smaller than the first text region,
   wherein determining text geometry information associated with the text comprises:
   extracting the feature block of the first text region from the feature representation of the image through region-of-interest conversion; and
   enhancing the feature block using a plurality of convolution layers in a convolutional neural network.

2. The method according to claim 1, wherein the extracting the feature block of the first text region comprises:
   obtaining the feature block of a predetermined size of the first text region, by converting the first text region into a predetermined number of rectangular regions.

3. The method according to claim 1, wherein the adjusting the first text region to a second text region comprises:
   sampling a plurality of centerline points from the text centerline at equal intervals;
   generating, based on the distance information, a plurality of upper border points and a plurality of lower border points corresponding to the plurality of centerline points; and
   obtaining a polygonal text box by connecting the plurality of upper border points and the plurality of lower border points.

4. The method according to claim 3, wherein the text geometry information further comprises a character region of the text, and
   wherein the adjusting the first text region to a second text region further comprises:
   verifying a confidence of the polygonal text box by using the character region; and
   determining, in response to the confidence satisfying a predetermined condition, the polygonal text box as the second text region.

5. The method according to claim 4, further comprising:
   dividing the polygonal text box into a plurality of quadrilateral text boxes based on the plurality of upper border points and the plurality of lower border points; and
   transforming the polygonal text box into a rectangular text box, by stretching each of the plurality of quadrilateral text boxes.

6. The method according to claim 4, wherein the first text region is represented by a quadrilateral text box, and
   wherein the sampling a plurality of centerline points from the text centerline at equal intervals comprises:
   determining, based on geometry information of the character region, a number of to-be-sampled centerline points.

7. The method according to claim 1,
   wherein the method further comprises:
   by using training data by an end-to-end way, performing training, so as to perform detecting the first text region and adjusting the first text region, the training data comprising images and annotated arbitrary shape text boxes.

8. An apparatus for detecting a text region in an image, comprising:
   at least one processor; and
   a memory storing instructions, the instructions when executed by the at least one processor, cause the at least one processor to perform operations, the operations comprising:
   detecting, based on feature representation of an image, one or more text regions in the image, a first text region of the one or more text regions being represented by a polygon and covering a text in the image, a region occupied by the text being of a certain shape;
   determining, based on a feature block of the first text region, text geometry information associated with the text, the text geometry information comprising at least a text centerline of the text and distance information of the centerline from an upper border of the text and a lower border of the text; and
   adjusting, based on the text geometry information associated with the text, the first text region to a second text region, the second text region also covering the text and being smaller than the first text region,
   wherein determining text geometry information associated with the text comprises:
   extracting the feature block of the first text region from the feature representation of the image through region-of-interest conversion; and
   enhancing the feature block using a plurality of convolution layers in a convolutional neural network.

9. The apparatus according to claim 8, wherein the extracting the feature block of the first text region comprises:
   obtaining the feature block of a predetermined size of the first text region, by converting the first text region into a predetermined number of rectangular regions.

10. The apparatus according to claim 8, wherein the adjusting the first text region to a second text region comprises:
    sampling a plurality of centerline points from the text centerline at equal intervals;
    generating, based on the distance information, a plurality of upper border points and a plurality of lower border points corresponding to the plurality of centerline points; and obtaining a polygonal text box by connecting the plurality of upper border points and the plurality of lower border points.

11. The apparatus according to claim 10, wherein the text geometry information further comprises a character region of the text, and
wherein the adjusting the first text region to a second text region further comprises:
verifying a confidence of the polygonal text box by using the character region; and
determining, in response to the confidence satisfying a predetermined condition, the polygonal text box as the second text region.

12. The apparatus according to claim 11, wherein the operations further comprise:
dividing the polygonal text box into a plurality of quadrilateral text boxes based on the plurality of upper border points and the plurality of lower border points; and
transforming the polygonal text box into a rectangular text box, by stretching each of the plurality of quadrilateral text boxes.

13. The apparatus according to claim 11, wherein the first text region is represented by a quadrilateral text box, and
wherein the sampling a plurality of centerline points from the text centerline at equal intervals comprises:
determining, based on geometry information of the character region, a number of to-be-sampled centerline points.

14. The apparatus according to claim 8, wherein the operations comprise:
by using training data by an end-to-end way, performing training so as to perform detecting the first text region and adjusting the first text region, the training data comprising images and annotated arbitrary shape text boxes.

15. A non-transitory computer-readable storage medium, storing a computer program, wherein when the program is executed by a processor, causes the processor to perform operations comprising:
detecting, based on feature representation of an image, one or more text regions in the image, a first text region of the one or more text regions being represented by a polygon and covering a text in the image, a region occupied by the text being of a certain shape;
determining, based on a feature block of the first text region, text geometry information associated with the text, the text geometry information comprising at least a text centerline of the text and distance information of the centerline from an upper border of the text and a lower border of the text; and
adjusting, based on the text geometry information associated with the text, the first text region to a second text region, the second text region also covering the text and being smaller than the first text region,
wherein determining text geometry information associated with the text comprises:
extracting the feature block of the first text region from the feature representation of the image through region-of-interest conversion; and
enhancing the feature block using a plurality of convolution layers in a convolutional neural network.

16. The medium according to claim 15, the extracting the feature block of the first text region comprises:
obtaining the feature block of a predetermined size of the first text region, by converting the first text region into a predetermined number of rectangular regions.

17. The medium according to claim 15, wherein the adjusting the first text region to a second text region comprises:
sampling a plurality of centerline points from the text centerline at equal intervals;
generating, based on the distance information, a plurality of upper border points and a plurality of lower border points corresponding to the plurality of centerline points; and
obtaining a polygonal text box by connecting the plurality of upper border points and the plurality of lower border points.

* * * * *